United States Patent Office 3,556,956

Patented Jan. 19, 1971

3,556,956

ELECTROLESS PLATING OF SUBSTRATES

George T. Miller, Lewiston, N.Y., assignor to Hooker Chemical Corporation, Niagara Falls, N.Y., a corporation of New York No Drawing. Continuation-in-part of application Ser. No. 683,793, Nov. 17, 1967, which is a continuation-in-part of application Ser. No. 614,541, Feb. 8, 1967. This application Aug. 5, 1968, Ser. No. 749,982

Int. Cl. C23b *5/60;* B44d *1/092*

U.S. Cl. 204—30 19 Claims

ABSTRACT OF THE DISCLOSURE

Substrates, particularly thermoplastic resins and polymers, are plated with metals by pre-treatment of the substrate with phosphorus in an organic solvent to deposit phosphorus at the surface, followed by subjecting the substrate to electroless plating to provide an adherent metallic coating on the substrate.

REFERENCE TO PRIOR APPLICATION

This is a continuation-in-part of application Ser. No. 683,793, filed Nov. 17, 1967, which is a continuation-in-part of application Ser. No. 614,541, filed Feb. 8, 1967.

BACKGROUND OF THE INVENTION

There is a rapidly increasing demand for metal plated articles, for example, in the production of low cost plastic articles that have a simulated metal appearance. Such articles are in demand in suh industries as automotive, home appliance, radio and television and for use in decorative containers and the like. Heretofore, the metal plating of plastics and the like has required many process steps, and generally such processes have been applicable to only one or a few related substrates.

It is an object of this invention to provide a simple process for the metal plating of plastics. Another object of the invention is to provide a process that is applicable to the plating of many different substrates, particularly the thermoplastic polymers. A further object of the invention is to provide articles having an adherent metal coating. Such coatings are electrically conductive whereby static charges are readily dissipated from the surfaces. The metal coatings further serve to protect the articles from abrasion, scratching and marring, reduce their porosity and improve their thermal conductivity. The process of this invention can be used for unidirectional mirrors and the like; water and liquid collecting devices and the like; protective coatings on houses, cars, boats, power line poles, street lights and the like; in thermal control of clothing, houses and the like; and the like.

SUMMARY OF THE INVENTION

This invention provides a process for electroless metal plating of a substrate.

More particularly, this invention provides a process which comprises subjecting a substrate to phosphorus so as to deposit phosphorus at the surface of the substrate and then subjecting the treated substrate to electroless metal plating to deposit a conductive coating on the surface. Thereafter, the article can be electroplated so as to deposit an adherent metal coating of the desired thickness on the conductive coating.

Also in accordance with the invention, there is provided an article having a metallic coating adherently formed at the surface of the substrate.

DESCRIPTION OF THE PREFERRED EMBODIMENTS

The process of this invention is applicable to nonconductive substrates, such as plastics and to other substantially non-metallic substrates. Suitable substrates include, but are not limited to, cellulosic and ceramic materials such as cloth, paper, wood, cork, cardboard, clay, porcelain, leather, porous glass, asbestos cement, and the like.

Typical plastics to which the process of this invention is applicable include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene with other olefins, polybutadiene; polymers of butadiene, polyisoprene, both natural and synthetic, polystyrene and polymers of pentene, hexene, heptene, octene, 2-methylpropene, 4-methyl-hexene-1, bicyclo-(2.2.1)-2-heptene, pentadiene, hexadiene, 2,3-dimethylbutadiene-1,3,4-vinylcyclohexene, cyclopentadiene, methylstyrene, and the like. Other polymers useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer; polyformaldehyde; polyphenylene oxide, polymers of diallyl phthalates and phthalates; polycarbonates of phosgene or thiophosgene and dihydroxy compounds such as bisphenols, thermoplastic polymers of bisphenols and epichlorohydrin (trade named Phenoxy polymers); graft copolymers of polymers of unsaturated hydrocarbons and an unsaturated monomer, such as graft copolymers of polybutadiene, styrene and acrylonitrile, commonly called ABS resins; ABS-polyvinyl chloride polymers, recently introduced under the trade name of Cycovin; and acrylic polyvinyl chloride polymers, known by the trade name of Kydex 100.

The polymers of the invention can be used in the unfilled condition, or with fillers such as glass fiber, glass powder, glass beads, asbestos, talc and other mineral fillers, wood flour and other vegetable fillers, carbon in its various forms, dyes, pigments, waxes and the like. If a wax is used as a filler, it has been found that the harder the wax, the more adherent the metal will be bound to the substrate.

The substrates of the invention can be in various physical forms, such as shaped articles, for example, moldings, sheets, rods, and the like; fibers, films and fabrics, and the like.

In the first step of the preferred process of the invention, the substrate is treated with elemental white phosphorus, which includes the various impure or commercial grades sometimes referred to as yellow phosphorus. The phosphorus can be utilized in the vapor phase, as a liquid or dissolved in a solvent.

Suitable solvents or diluents for the elemental phosphorus are solvents that dissolve elemental phosphorus and which preferably swell the surface of a plastic without detrimentally affecting the surface of the plastic. Such solvents include the halogenated hydrocarbons and halocarbons such as chloroform, methyl chloroform, phenyl chloroform, dichloroethylene, trichloroethylene, perchloroethylene, trichloroethane, dichloropropane, ethyl dibromide, ethyl chlorobromide, propylene dibromide, monochlorobenzene, monochlorotoluene and the like; aromatic hydrocarbons such as benzene, toluene, xylene, ethyl benzene, naphthalene and the like.

When a solution of phosphorus is employed in the process, the solution concentration is generally in the range from about 0.0001 weight percent of phosphorus based on the weight of the solution up to a saturated solution, and preferably from about 1.5 to about 2.5 percent. Prior to contacting the plastic with the elemental phosphorus, in gaseous, liquid or solution, the surface of the substrate should be clean. When a solution is used, the solvent generally serves to clean the surface. A solvent wash may be desirable when gaseous or liquid phosphorus is employed. However, it is not necessary to subject the surface to special treatment such as etching, polishing and the like. The phosphorus treatment is generally conducted at a temperature below the softening point of the substrate, and below the boiling point of the solvent, if a solvent is used. Generally the temperature is in the range of about 30 to 135 degrees centigrade, but preferably in the range of about 50 to 100 degrees centigrade. The contact time varies depending on the nature of the substrate, the solvent and temperature, but it generally in the range of about one second to one hour or more, preferably in the range of about one to ten minutes.

As a result of the first treatment step, the phosphorus is deposited at the surface of the substrate. By this is meant that the phosphorus can be located on the surface, embedded in the surface and embedded beneath the surface of the substrate. The location of the phosphorus is somewhat dependent on the action of the solvent on the surface if one is used.

Following the first treatment step, the substrate can be rinsed with a solvent, and then can be dried by merely exposing the substrate to the atmosphere or to inert atmospheres such as nitrogen, carbon dioxide, and the like, or by drying the surface with radiant heaters or in a conventional oven. Drying times can vary considerably, for example, from one second to 30 minutes or more, preferably 5 seconds to 10 minutes, more preferably 5 to 120 seconds. The rinsing and drying steps are optional.

The treated substrates that result from subjecting the substrate to phosphorus are subjected to a process that has become known in the art as electroless plating or chemical plating. In a typical electroless plating process, a catalytic surface is contacted with a solution of a metal salt under conditions in which the metallic ion of the metal salt is reduced to the metallic state and deposited on the catalytic surface. The electroless baths generally contain the reducible metal salt, a reducing agent, buffering agents, complexing agents, and other additives. The use of this process with the products of this invention relies upon the catalytic sites deposited on the surface as a result of the treatment with the phosphorous. A suitable chemical treating bath for the deposition of a nickel coating on the catalytic surface produced in accordance with the process of the invention can comprise, for example, a solution of a nickel salt in an aqueous hypophosphite solution. Suitable hypophosphites include the alkali metal hypophosphites such as sodium hypophosphite and potassium hypophosphite, and the alkaline earth metal hypophosphites such as calcium hypophosphite and barium hypophosphite. Other suitable metal salts for use in the chemical treating bath include the salts of metals selected from Groups I–B, II–B, IV–B, V–B, VI–B, VII–B and VIII of the Periodic Table appearing on pages 60–61 of Lange's Handbook of Chemistry (Revised Tenth edition) typical metal salts include arsenic trioxide, chromic bromide, cobalt chloride, copper nitrate, potassium gold cyanide, ferrous sulfate, nickel chloride, tetrammine palladium chloride and the like. Other reducing media include formaldehyde, hydroquinone and hydrazine. Suitable metals, solutions and conditions for electroless plating are described in Metal Finishing Guidebook Directory for 1967, published by Metals and Plastics Publications, Inc., Westwood, N.J.

The electroless treated substrates of the invention can be electroplated by processes known in the art. The article is generally used as a cathode. The metal desired to be plated is generally dissolved in an aqueous plating bath, although other media can be employed. Generally, a soluble metal anode of the metal to be plated can be employed. In some instances, however, a carbon anode or other inert anode is used. Suitable metals, solutions and conditions for electroplating are described in the Metal Finishing Guidebook Directory for 1967.

The following examples serve to illustrate the invention but are not intended to limit it. Unless specified otherwise in this specification and claims, all temperatures are in degrees centigrade and parts are understood to be expressed in parts by weight.

EXAMPLE 1

A sample of polypropylene was immersed in about a 10 percent phosphorus in benzene solution maintained at 80 degrees centigrade for 2 minutes, dried for 4 seconds and then subjected to an electroless bath for 15 minutes. The electroless bath contained 15 grams of nickel chloride, 5 grams of sodium hypophosphite, 25 grams of ammonium chloride, 50 grams of sodium citrate, 2 liters of water and sufficient ammonium hydroxide to bring the pH into the range of 8 to 10 and was maintained at a temperature of about 90 to 92 degrees centigrade. Upon removal from the electroless bath the polypropylene had a shiny metallic deposit formed at the surface of the plastic.

EXAMPLE 2

Example 1 was repeated except that the polypropylene remained in the electroless bath for 25 minutes to form a shiny metallic deposit at the surface of the plastic.

EXAMPLE 3

A sample of polyethylene was subjected to about a 10 percent phosphorus in trichloroethylene solution maintained at 70 degrees centigrade for 2 minutes. Thereafter, the polyethylene was subjected to an electroless bath maintained at a temperature of about 70 to 80 degrees centigrade for 10 minutes. The electroless bath contained 3 weight percent nickel chloride, 5 weight percent sodium hypophosphite and ammonium hydroxide. The plastic obtained a very conductive adherent, shiny, gray metallic deposit at the surface of the plastic.

EXAMPLE 4

Example 3 was repeated except that the electroless bath contained 10 percent sodium hypophosphite and the bath was maintained at 50 degrees centigrade. The polyethylene obtained a very conductive adherent, metallic deposit.

EXAMPLE 5

A polypropylene panel of about 150 $cm.^2$ area was rinsed in water, acetone and trichloroethylene and then dipped into a 2 percent solution of phosphorus in trichloroethylene at 55 degrees centigrade for 2 minutes. The panel was rinsed in cold water and then subjected for 10 minutes to an electroless bath maintained at 90 degrees centigrade. The electroless bath contained 27 grams of nickel sulfate hexahydrate, 25 grams of ammonium chloride, 50 grams of sodium citrate, 580 milliliters of distilled water, 35 milliliters of a solution prepared by dissolving 23 grams of sodium hypophosphite in 50 milliliters of water, and 40 milliliters of ammonium hydroxide. A very shiny metallic coating which had a resistance of 20 ohms was formed at the surface of the plastic. Thereafter, the plastic was electroplated with semi-bright nickel by immersion in a Harshaw semi-bright nickel bath and applying a current of one amp for the first 3 minutes, two amps for the next 3 minutes and 7 amps for the following 40 minutes.

EXAMPLES 6–19

Following the procedure of Example 3, the following substrates are provided with adherent conductive coatings:

| Example: | Substrate |
|---|---|
| 6 | Polyvinylchloride. |
| 7 | Polystyrene. |
| 8 | Polyvinylacetate. |
| 9 | Acrylic-polyvinylchloride polymer. |
| 10 | ABS resin. |
| 11 | Polycarbonate. |
| 12 | Phenol-formaldehyde. |
| 13 | Polyphenylene oxide. |
| 14 | Wood. |
| 15 | Cardboard. |
| 16 | Cork. |
| 17 | Porous clay. |
| 18 | Asbestos cement. |
| 19 | Porcelain (unglazed). |

EXAMPLE 20

Following the procedure of Example 3, a sample of polypropylene is subjected to a copper electroless bath to obtain a conductive coating. The bath contains 15 grams per liter copper nitrate, 10 grams per liter sodium bicarbonate, 30 grams per liter potassium sodium tartrate and 100 milliliters per liter 37 percent formaldehyde and is operated at about 24 degrees centigrade.

It can be seen from the foregoing examples that substrates subjected to the phosphorus treatment of this invention can thereafter be subjected to any electroless bath to obtain a conductive coating at the surface of the substrates.

Various changes and modifications can be made in the process and products of this invention without departing from the spirit and scope of the invention. Various embodiments of the invention disclosed herein serve to further illustrate the invention but are not intended to limit it.

I claim:

1. A process which comprises contacting a non-conductive substrate with white phosphorus to deposit elemental phosphorus at the surface of the substrate, and electroless metal plating the elemental phosphorus treated substrate to deposit a conductive coating thereon.

2. The process of claim 1 wherein the substrate is subjected to a solution of phosphorus dissolved in a solvent.

3. The process of claim 2 wherein the solvent is trichloroethylene.

4. The process of claim 2 wherein the solvent is benzene.

5. A process wherein the treated substrate resulting from the process of claim 1 is electroplated to deposit an adherent metal coating on the treated substrate.

6. A process which comprises contacting a plastic with white phosphorus to deposit elemental phosphorus at the surface of the plastic, and electroless metal plating the elemental phosphorus treated plastic to deposit a conductive coating thereon.

7. The process of claim 6 wherein the plastic is subjected to a solution of phosphorus dissolved in a solvent.

8. The process of claim 7 wherein the solvent is trichloroethylene.

9. The process of claim 7 wherein the solvent is benzene.

10. The process of claim 7 wherein the plastic is polypropylene.

11. The process of claim 7 wherein the plastic is polyethylene.

12. A process wherein the treated plastic resulting from the process of claim 6 is electroplated to deposit an adherent metal coating on the treated plastic.

13. A process for producing a conductive coating on a non-conductive substrate which comprises electroless metal plating a substrate which has been contacted with white phosphorus so as to deposit elemental phosphorus at the surface of the substrate.

14. A process for producing a conductive coating on a plastic which comprises electroless metal plating a plastic which has been contacted with white phosphorus so as to deposit elemental phosphorus at the surface of the plastic.

15. A process wherein the substrate resulting from the process of claim 14 is electroplated to deposit an adherent metal coating on the treated substrate.

16. An article produced by a process which comprises contacting a non-conductive substrate with white phosphorus to deposit elemental phosphorus at the surface of the substrate and electroless metal plating the elemental phosphorus treated substrate to deposit a conductive coating thereon.

17. The article of claim 16 wherein the substrate is a plastic.

18. The article of claim 17 wherein the plastic is polypropylene.

19. The article of claim 17 wherein the plastic is polyethylene.

References Cited

UNITED STATES PATENTS

| | | | |
|---|---|---|---|
| 2,551,342 | 5/1951 | Scholl | 117—47X |
| 3,235,426 | 2/1966 | Bruner | 156—2 |
| 3,423,226 | 1/1969 | Jensen | 117—47 |
| 3,282,737 | 11/1966 | Hintermann et al. | 136—120 |

JOHN H. MACK, Primary Examiner

T. TUFARIELLO, Assistant Examiner

U.S. Cl. X.R.

117—47; 204—20